US010189990B2

(12) United States Patent
Zhang et al.

(10) Patent No.: US 10,189,990 B2
(45) Date of Patent: Jan. 29, 2019

(54) POLY(PHENYLENE ETHER) COMPOSITION AND ARTICLE

(71) Applicant: SABIC GLOBAL TECHNOLOGIES B.V., Bergen op Zoom (NL)

(72) Inventors: Fen Zhang, Shanghai (CN); Mingcheng Guo, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/569,146

(22) PCT Filed: Mar. 17, 2016

(86) PCT No.: PCT/IB2016/051517
§ 371 (c)(1),
(2) Date: Oct. 25, 2017

(87) PCT Pub. No.: WO2016/174534
PCT Pub. Date: Nov. 3, 2016

(65) Prior Publication Data
US 2018/0355169 A1 Dec. 13, 2018

Related U.S. Application Data

(60) Provisional application No. 62/152,990, filed on Apr. 27, 2015.

(51) Int. Cl.
  *C08L 71/12* (2006.01)
  *H02S 40/34* (2014.01)
  *H02G 3/08* (2006.01)
(52) U.S. Cl.
  CPC ............ *C08L 71/123* (2013.01); *H02G 3/088* (2013.01); *H02S 40/34* (2014.12); *C08L 2201/02* (2013.01);
(Continued)

(58) Field of Classification Search
  CPC ............... C08L 71/123; C08L 2205/03; C08L 2205/08; C08L 2205/025; C08L 2201/02;
(Continued)

(56) References Cited

U.S. PATENT DOCUMENTS 4,309,513 A  1/1982 Ueno et al.
4,318,836 A  3/1982 Abolins
(Continued)

FOREIGN PATENT DOCUMENTS

CN  101747616 A  6/2010
CN  101805509 A  8/2010
(Continued)

OTHER PUBLICATIONS

Allen et al., "Synthesis and properties of xylenyl ether-dimethylsiloxane triblock polymers", Polymer Bulletin 19, 1988, pp. 103-110.
(Continued)

*Primary Examiner* — Michael C Miggins
(74) *Attorney, Agent, or Firm* — Cantor Colburn LLP

(57) ABSTRACT

A composition includes specific amounts of a poly(phenylene ether), a polystyrene-poly(ethylene-butylene)-polystyrene triblock copolymer, an organophosphate ester, and compound that improves adhesion to potting silicone sealant. The adhesion promoter can be a phenolic compound, a hydroxysilyl-terminated polydiorganosiloxane, or a combination thereof. The composition is particularly useful for molding parts of photovoltaic junction boxes that utilize potting silicone sealant as an internal electrical insulator.

14 Claims, 1 Drawing Sheet

(52) U.S. Cl.
CPC ... *C08L 2203/204* (2013.01); *C08L 2203/206* (2013.01); *C08L 2205/025* (2013.01); *C08L 2205/03* (2013.01); *C08L 2205/035* (2013.01); *C08L 2205/08* (2013.01)

(58) Field of Classification Search
CPC ......... C08L 2203/204; C08L 2203/206; C08L 2205/035; H02S 40/34; H02G 3/088
See application file for complete search history.

(56) References Cited

U.S. PATENT DOCUMENTS

| | | |
|---|---|---|
| 4,322,507 A | 3/1982 | Haaf |
| 4,332,714 A | 6/1982 | Haaf et al. |
| 4,436,854 A | 3/1984 | Brandstetter et al. |
| 4,529,652 A | 7/1985 | Bussink et al. |
| 4,684,681 A | 8/1987 | Lee, Jr. et al. |
| 4,822,836 A | 4/1989 | Wroczynski |
| 4,871,816 A | 10/1989 | Percec et al. |
| 5,032,635 A | 7/1991 | Avakian et al. |
| 5,094,806 A | 3/1992 | Laughner |
| 5,206,276 A | 4/1993 | Lee, Jr. |
| 5,281,686 A | 1/1994 | Blohm et al. |
| 5,294,654 A | 3/1994 | Hellstern-Burnell et al. |
| 5,304,593 A | 4/1994 | Nishio et al. |
| 5,357,003 A | 10/1994 | Smits et al. |
| 5,364,898 A | 11/1994 | Lee et al. |
| 5,470,913 A | 11/1995 | Van der Meer et al. |
| 5,499,087 A | 3/1996 | Hiraoka et al. |
| 5,693,700 A | 12/1997 | Venkataramani et al. |
| 5,714,550 A | 2/1998 | Shaw |
| 5,998,503 A | 12/1999 | Jacobson et al. |
| 6,015,510 A | 1/2000 | Jacobson et al. |
| 6,339,131 B1 | 1/2002 | Cella et al. |
| 6,344,612 B1 | 2/2002 | Kuwahara et al. |
| 6,815,491 B2 | 11/2004 | Adedeji et al. |
| 6,908,964 B2 | 6/2005 | Adedeji et al. |
| 7,087,666 B2 | 8/2006 | Hoerold et al. |
| 7,253,227 B2 | 8/2007 | Mhetar et al. |
| 7,291,036 B1 | 11/2007 | Daily et al. |
| 7,371,790 B2 | 5/2008 | Yoshida et al. |
| 7,387,537 B1 | 6/2008 | Daily et al. |
| 7,541,399 B2 | 6/2009 | Yoshida et al. |
| 7,550,534 B2 | 6/2009 | Zhao et al. |
| 7,576,150 B2 | 8/2009 | Klei et al. |
| 7,585,906 B2 | 9/2009 | Klei et al. |
| 7,763,807 B2 | 7/2010 | Richter |
| 7,824,189 B1 | 11/2010 | Lauermann et al. |
| 7,847,032 B2 | 12/2010 | Guo et al. |
| 8,057,873 B2 | 11/2011 | Levasalmi |
| 8,252,858 B2 | 8/2012 | Kishore et al. |
| 8,653,167 B2 | 2/2014 | Lietzau et al. |
| 9,208,617 B2 | 12/2015 | Hatanaka et al. |
| 2003/0027459 A1 | 2/2003 | Lee |
| 2003/0036602 A1 | 2/2003 | Adedeji et al. |
| 2003/0125430 A1 | 7/2003 | Adedeji et al. |
| 2004/0122170 A1 | 6/2004 | Mhetar et al. |
| 2004/0235993 A1 | 11/2004 | Yoshida et al. |
| 2004/0260036 A1 | 12/2004 | Fishburn |
| 2005/0080185 A1 | 4/2005 | Mhetar |
| 2006/0020077 A1 | 1/2006 | Miyoshi et al. |
| 2006/0030176 A1 | 2/2006 | Ikeda et al. |
| 2006/0106139 A1 | 5/2006 | Kosaka et al. |
| 2006/0111548 A1 | 5/2006 | Elkovitch et al. |
| 2006/0182967 A1 | 8/2006 | Kosaka et al. |
| 2007/0100059 A1 | 5/2007 | Mullen |
| 2007/0238190 A1 | 10/2007 | Klei et al. |
| 2008/0167407 A1 | 7/2008 | Kishore et al. |
| 2008/0245270 A1 | 10/2008 | Klei et al. |
| 2008/0248278 A1 | 10/2008 | Fisher et al. |
| 2009/0275684 A1 | 11/2009 | Landia |
| 2010/0068921 A1 | 3/2010 | Richter |
| 2010/0218797 A1 | 9/2010 | Coyle, Jr. et al. |
| 2010/0294903 A1 | 11/2010 | Shmukler et al. |
| 2011/0003962 A1 | 1/2011 | Carrillo et al. |
| 2011/0147076 A1 | 6/2011 | Chen et al. |
| 2011/0152471 A1 | 6/2011 | Kamalakaran et al. |
| 2011/0232963 A1 | 9/2011 | Kono et al. |
| 2011/0293937 A1 | 12/2011 | Delsman et al. |
| 2012/0148817 A1 | 6/2012 | Riding |
| 2012/0308753 A1 | 12/2012 | Balfour |
| 2013/0030096 A1 | 1/2013 | Lietzau |
| 2014/0045979 A1 | 2/2014 | Ziegler et al. |
| 2014/0065348 A1 | 3/2014 | Lee et al. |
| 2014/0073725 A1 | 3/2014 | Tople et al. |
| 2014/0128522 A1 | 5/2014 | Lietzau et al. |

FOREIGN PATENT DOCUMENTS

| | | |
|---|---|---|
| CN | 201562817 | 8/2010 |
| CN | 101982500 A | 3/2011 |
| CN | 201845793 | 5/2011 |
| CN | 102104218 A | 6/2011 |
| DE | 3834086 A1 | 4/1990 |
| EP | 0033146 A1 | 8/1981 |
| EP | 0467113 A1 | 7/1990 |
| EP | 2256167 A1 | 12/2010 |
| EP | 2360210 A1 | 8/2011 |
| GB | 1591137 A | 6/1981 |
| JP | 60112846 A | 6/1985 |
| JP | 1986252214 | 11/1986 |
| JP | 63061047 A | 3/1988 |
| JP | 03126744 A | 5/1991 |
| JP | 07126516 A | 5/1995 |
| JP | 07292184 A | 11/1995 |
| JP | 9279044 A | 10/1997 |
| JP | 10087984 | 4/1998 |
| JP | 2001233960 A | 8/2001 |
| JP | 2002047409 A | 2/2002 |
| JP | 2003105193 A | 4/2003 |
| JP | 2005060529 A | 3/2005 |
| JP | 2006057107 A | 3/2006 |
| JP | 2006299235 A | 11/2006 |
| JP | 2008060389 A | 3/2008 |
| JP | 2008269954 A | 11/2008 |
| JP | 2008274035 A | 11/2008 |
| JP | 4214780 B2 | 1/2009 |
| JP | 2009249515 A | 10/2009 |
| JP | 2010031283 A | 2/2010 |
| JP | 2010254994 A | 11/2010 |
| JP | 2011219531 A | 11/2011 |
| JP | 2013053222 A | 3/2013 |
| JP | 2006291076 A | 10/2016 |
| WO | 2002057363 A2 | 7/2002 |
| WO | 2007016296 A2 | 9/2007 |
| WO | 2012082535 A2 | 6/2012 |

OTHER PUBLICATIONS

Final Office Action for U.S. Appl. No. 13/189,651, dated Sep. 6, 2013, 23 pages.
Final Office Action for U.S. Appl. No. 13/570,301, dated Jan. 9, 2014, 10 pages.
International Search Report and Written Opinion for International Application No. PCT/US2012/069371, International Filing Date Dec. 13, 2012, dated May 27, 2013, 11 pages.
International Search Report for International Application No. PCT/US2012/037743, International Filing Date Nov. 29, 2012, dated May 14, 2012, 6 pages.
International Search Report for International Application No. PCT/IB2016/051517 International Filing Date Mar. 17, 2016, dated Jun. 24, 2016, 10 pages.
International Search Report for International Application No. PCT/US2012/044897; International Application Filing Date: Jun. 29, 2012; dated Jan. 23, 2013; 5 pages.
International Search Report for International Application No. PCT/US2013/068364; International Filing Date Nov. 5, 2013, dated Feb. 5, 2014, 5 pages.
Non-Final Office Action for U.S. Appl. No. 13/189,651, dated Mar. 18, 2013, 53 pages.
Non-Final Office Action for U.S. Appl. No. 13/189,651, dated Apr. 16, 2014, 14 pages.

(56) References Cited

OTHER PUBLICATIONS

Non-Final Office Action for U.S. Appl. No. 13/570,301, dated Sep. 10, 2013, 78 pages.
Pape et al., "The Role of Silicone Powders in Reducing the Heat Release Rate and Evolution of Smoke in Flame Retardant Thermoplastics", Journal of Vinyl & Additive Technology, Sep. 1997, vol. 3, No. 3, pp. 225-232.
Written Opinion for International Application No. PCT/IB2016/051517, International Filing Date Mar. 17, 2016, dated Jun. 24, 2016, 10 pages.
Written Opinion for International Application No. PCT/US2012/037743, International Filing Date May 14, 2012, dated Nov. 28, 2012, 3 pages.
Written Opinion for International Application No. PCT/US2012/044897, International Filing Date Jun. 29, 2012, dated Jan. 23, 2013, 3 pages.
Written Opinion for International Application No. PCT/US2013/068364, International Filing Date Nov. 5, 2013, dated Feb. 5, 2014, 6 pages.

POLY(PHENYLENE ETHER) COMPOSITION AND ARTICLE

CROSS-REFERENCE TO RELATED APPLICATIONS

This application is a National Stage application of PCT/IB2016/051517, filed Mar. 17, 2016, which claims the benefit of U.S. Provisional Application No. 62/152,990, filed Apr. 27, 2015, both of which are incorporated by reference herein in their entirety.

BACKGROUND OF THE INVENTION

Photovoltaic junction boxes are generally rectangular, low-profile plastic housings that protect electrical connections against the rigorous challenges of the outdoor environment at various points within a photovoltaic installation, from individual solar energy collection panels into power collection circuits and power management equipment for delivery to a local electrical load circuit or outgoing power transmission lines. These junction boxes may contain a varying number of wiring compartments and may be provided with wiring terminals, connectors, or leads to accommodate current-carrying conductors in a secure manner to assure that reliable and reproducible connections can readily be accomplished in the field.

Photovoltaic junction boxes must therefore be manufactured to exacting tolerances to provide a durable weather-resistant housing for electrical connections that maintains its protective integrity while withstanding challenges such as impacts from objects, wind-driven rain, and exposure to extreme heat, damaging ultraviolet radiation, and fire. Therefore, polymeric materials used for the manufacture of photovoltaic junction boxes must simultaneously meet several property requirements relating to moldability, flame retardancy, heat resistance, and ductility. In addition, the polymeric materials must have good oxidation resistance to retain useful properties for an extended period of time in outdoor use.

Some poly(phenylene ether)-based resins are currently used for photovoltaic junction boxes and connectors. These compositions provide a desirable property balance of the properties described above. However, particularly when the photovoltaic junction box is constructed from potting silicone sealant as well as the poly(phenylene ether) composition, known poly(phenylene ether) compositions can provide inadequate adhesion to the potting silicone sealant. There is therefore a need for poly(phenylene ether) compositions with improved adhesion to potting silicone sealant.

BRIEF SUMMARY OF EMBODIMENTS OF THE INVENTION

One embodiment is a composition comprising, based on the total weight of the composition: 61 to 89 weight percent of a poly(phenylene ether); 3 to 10 weight percent of a polystyrene-poly(ethylene-butylene)-polystyrene triblock copolymer having a polystyrene content of 20 to 40 weight percent and a weight average molecular weight of 200,000 to 400,000 daltons; 6 to 12 weight percent of a flame retardant comprising an organophosphate ester; and 2 to 17 weight percent of an adhesion promoter selected from the group consisting of (a) phenolic compounds having a molecular weight of 94 to 18,000 daltons; (b) hydroxysilyl-terminated polydiorganosiloxanes of the formula

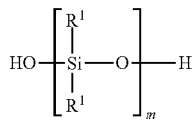

wherein m is 2 to 50, and each occurrence of $R^1$ is independently $C_1$-$C_{12}$ hydrocarbyl, provided that 5 to 60 mole percent of the occurrences of $R^1$ are independently $C_6$-$C_{12}$ aryl; and (c) combinations of the (a) phenolic compounds and the (b) hydroxysilyl-terminated polydiorganosiloxanes.

Another embodiment is an article comprising an injection molded part, and a cured potting silicone sealant in contact with a surface of the injection molded part; wherein the injection molded part comprises a composition comprising 61 to 89 weight percent of a poly(phenylene ether); 3 to 10 weight percent of a polystyrene-poly(ethylene-butylene)-polystyrene triblock copolymer having a polystyrene content of 20 to 40 weight percent and a weight average molecular weight of 200,000 to 400,000 daltons; 6 to 12 weight percent of a flame retardant comprising an organophosphate ester; and 2 to 17 weight percent of an adhesion promoter selected from the group consisting of (a) phenolic compounds having a molecular weight of 94 to 18,000 daltons; (b) hydroxysilyl-terminated polydiorganosiloxanes of the formula

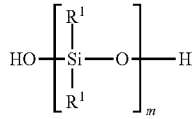

wherein m is 2 to 50, and each occurrence of $R^1$ is independently $C_1$-$C_{12}$ hydrocarbyl, provided that 5 to 60 mole percent of the occurrences of $R^1$ are independently $C_6$-$C_{12}$ aryl; and (c) combinations of the (a) phenolic compounds and the (b) hydroxysilyl-terminated polydiorganosiloxanes.

These and other embodiments are described in detail below.

BRIEF DESCRIPTION OF THE DRAWINGS

Referring now to the drawings wherein like elements are numbered alike in several FIGURES.

DETAILED DESCRIPTION OF THE INVENTION

Figure 1:
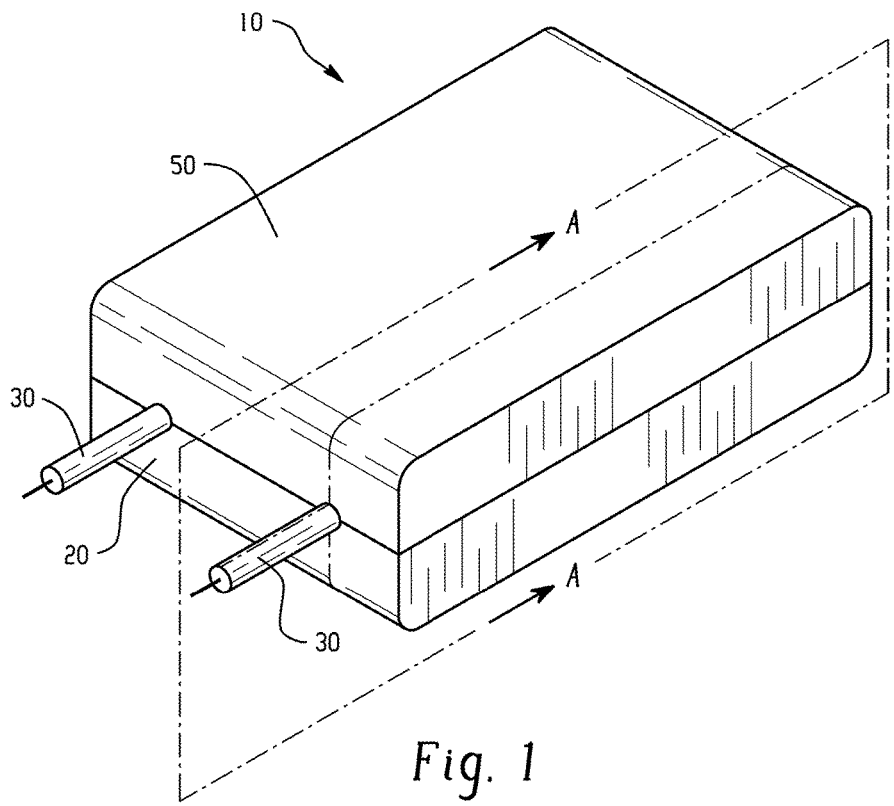
FIG. 1 is an elevated view of a photovoltaic junction box.

The present inventors have determined that improved adhesion to potting silicone sealant is exhibited by a poly(phenylene ether) composition containing an adhesion promoter that is a relatively low molecular weight phenol, or a hydroxysilyl-terminated polydiorganosiloxane.

One embodiment is a composition comprising, based on the total weight of the composition: 61 to 89 weight percent of a poly(phenylene ether); 3 to 10 weight percent of a polystyrene-poly(ethylene-butylene)-polystyrene triblock copolymer having a polystyrene content of 20 to 40 weight percent and a weight average molecular weight of 200,000 to 400,000 daltons; 6 to 12 weight percent of a flame retardant comprising an organophosphate ester; and 2 to 17 weight percent of an adhesion promoter selected from the group consisting of (a) phenolic compounds having a molecular weight of 94 to 18,000 daltons; (b) hydroxysilyl-terminated polydiorganosiloxanes of the formula

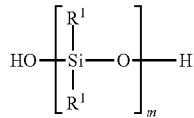

wherein m is 2 to 50, and each occurrence of $R^1$ is independently $C_1$-$C_{12}$ hydrocarbyl, provided that 5 to 60 mole percent of the occurrences of $R^1$ are independently $C_6$-$C_{12}$ aryl; and (c) combinations of the (a) phenolic compounds and the (b) hydroxysilyl-terminated polydiorganosiloxanes.

The composition comprises a poly(phenylene ether). Poly(phenylene ether)s include those comprising repeating structural units having the formula

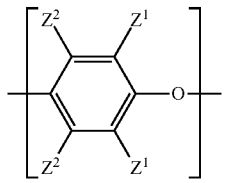

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxyl group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

In some embodiments, the poly(phenylene ether) comprises a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block.

In some embodiments, the poly(phenylene ether)-polysiloxane block copolymer is prepared by an oxidative copolymerization method. In this method, the poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-determinated polysiloxane can comprise a plurality of repeating units having the structure

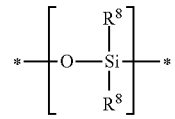

wherein each occurrence of $R^8$ is independently hydrogen, $C_1$-$C_{12}$ hydrocarbyl or $C_1$-$C_{12}$ halohydrocarbyl; and two terminal units having the structure

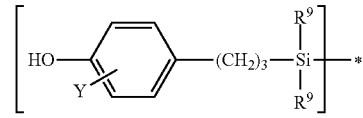

wherein Y is hydrogen, $C_1$-$C_{12}$ hydrocarbyl, $C_1$-$C_{12}$ hydrocarbyloxy, or halogen, and wherein each occurrence of $R^9$ is independently hydrogen, $C_1$-$C_{12}$ hydrocarbyl or $C_1$-$C_{12}$ halohydrocarbyl. In a very specific embodiment, each occurrence of $R^8$ and $R^9$ is methyl, and Y is methoxyl.

In some embodiments, the monohydric phenol comprises 2,6-dimethylphenol, and the hydroxyaryl-terminated polysiloxane has the structure

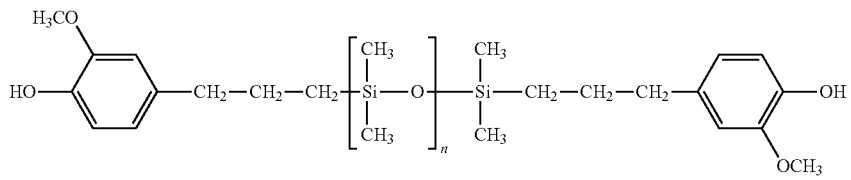

wherein n is, on average, 5 to 100, specifically 30 to 60.

The oxidative copolymerization method produces poly(phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. No. 8,017,697 to Carrillo et al., and U.S. Patent Application Publication No. US 2012/0329961 A1 of Carrillo et al.

In some embodiments, the poly(phenylene ether) has an intrinsic viscosity of 0.25 to 1 deciliter per gram measured by Ubbelohde viscometer at 25° C. in chloroform. Within this range, the poly(phenylene ether) intrinsic viscosity can be 0.3 to 0.65 deciliter per gram, more specifically 0.3 to 0.5 deciliter per gram, even more specifically 0.35 to 0.5 deciliter per gram.

In some embodiments, the poly(phenylene ether) comprises a homopolymer or copolymer of monomers selected from the group consisting of 2,6-dimethylphenol, 2,3,6-trimethylphenol, and combinations thereof. In some embodiments, the poly(phenylene ether) comprises a poly(phenylene ether)-polysiloxane block copolymer. In these embodiments, the poly(phenylene ether)-polysiloxane block copolymer can, for example, contribute 0.05 to 2 weight percent, specifically 0.1 to 1 weight percent, more specifically 0.2 to 0.8 weight percent, of siloxane groups to the composition as a whole.

The composition comprises the poly(phenylene ether) in an amount of 61 to 89 weight percent, based on the total weight of the composition. Within this range, the poly(phenylene ether) amount can be 65 to 85 weight percent, specifically 70 to 81 weight percent.

In addition to the poly(phenylene ether), the composition comprises a polystyrene-poly(ethylene-butylene)-polystyrene triblock copolymer. The polystyrene-poly(ethylene-butylene)-polystyrene triblock copolymer has a polystyrene content of 20 to 40 weight percent, based on the weight of the triblock copolymer. Polystyrene content can be determined by $^1$H or $^{13}$C nuclear magnetic resonance spectroscopy. The polystyrene-poly(ethylene-butylene)-polystyrene triblock copolymer has a weight average molecular weight of 200,000 to 400,000 daltons. Weight average molecular weight can be determined by gel permeation chromatography using polystyrene standards. Methods for preparing polystyrene-poly(ethylene-butylene)-polystyrene triblock copolymers are known in the art, and such copolymers are also commercially available. A polystyrene-poly(ethylene-butylene)-polystyrene triblock copolymer meeting the present requirements is available as KRATON™ G1651 from Kraton Performance Polymers, Inc.

The composition comprises the polystyrene-poly(ethylene-butylene)-polystyrene triblock copolymer in an amount of 3 to 10 weight percent, based on the total weight of the composition. Within this range, the triblock copolymer amount can be 4 to 8 weight percent.

In addition to the poly(phenylene ether) and the polystyrene-poly(ethylene-butylene)-polystyrene triblock copolymer, the composition comprises a flame retardant. The flame retardant comprises an organophosphate ester. Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), t-butylphenyl diphenyl phosphates (CAS Reg. No. 56803-37-3), bis(t-butylphenyl) phenyl phosphates (CAS Reg. No. 65652-41-7), tris(t-butylphenyl) phosphates (CAS Reg. No. 78-33-1), and combinations thereof.

In some embodiments the organophosphate ester comprises a bis-aryl phosphate having the formula

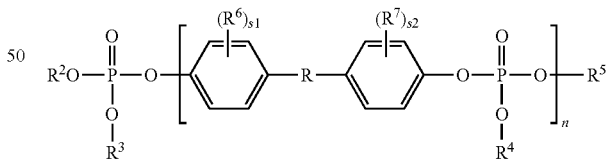

wherein R is independently at each occurrence a $C_1$-$C_{12}$ alkylene group; $R^6$ and $R^7$ are independently at each occurrence a $C_1$-$C_5$ alkyl group; $R^2$, $R^3$, and $R^5$ are independently a $C_1$-$C_{12}$ hydrocarbyl group; $R^4$ is independently at each occurrence a $C_1$-$C_{12}$ hydrocarbyl group; n is 1 to 25; and s1 and s2 are independently an integer equal to 0, 1, or 2. In some embodiments $OR^2$, $OR^3$, $OR^4$ and $OR^4$ are independently derived from phenol, a monoalkylphenol, a dialkylphenol, or a trialkylphenol.

As readily appreciated by one of ordinary skill in the art, the bis-aryl phosphate is derived from a bisphenol. Exemplary bisphenols include 2,2-bis(4-hydroxyphenyl)propane (bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In some embodiments, the bisphenol comprises bisphenol A.

The flame retardant can, optionally, comprise one or more flame retardants in addition to the organophosphate ester. Such optional flame retardants include metal dialkylphosphinates (such as aluminum tris(diethyl phosphinate)), nitrogen-containing flame retardants (including melamine phosphate, melamine pyrophosphate, melamine polyphosphate, and melamine cyanurate), metal hydroxides (such as magnesium hydroxide, aluminum hydroxide, and cobalt hydroxide), and combinations thereof.

In some embodiments, the flame retardant consists of the organophosphate ester.

The composition comprises the flame retardant in an amount of 6 to 12 weight percent, based on the total weight of the composition. Within this range, the flame retardant amount can be 7 to 11 weight percent.

In addition to the poly(phenylene ether), the polystyrene-poly(ethylene/butylene)-polystyrene triblock copolymer, and the flame retardant, the composition comprises an adhesion promoter to promote adhesion between cured potting silicone sealant and articles molded from the composition. The adhesion promoter can be a phenolic compound, a hydroxysilyl-terminated polydiorganosiloxane, or a combination thereof.

The phenolic compound has a molecular weight (or number average molecular weight in the case of an oligomer or polymer) of 94 to 18,000. In some embodiments, the phenolic compound comprises a monomeric phenol (such as phenol itself), a monomeric diphenol (such as 4,4'-diphenol, 3,4'-diphenol, 3,3'-diphenol, bisphenol A, and 2,2-bis(3,5-dimethyl-4-hydroxyphenyl)propane), a monomeric triphenol (such as tris(4-hydroxyphenyl)methane, and 1,1,1-tris(4-hydroxyphenyl)ethane), as well as monomeric polyphenols.

In some embodiments, the phenolic compound is oligomeric or polymeric. For example, in some embodiments, the phenolic compound comprises a polycarbonate having a number average molecular weight of 450 to 18,000 daltons, and a hydroxyaryl content of 450 to 35,000 parts per million by weight calculated as the weight of hydroxyl groups divided by the total weight of the phenolic compound. For example, for a polycarbonate having a number average molecular weight of 5,000 daltons and two hydroxyl groups, each hydroxyl group being directly bound to an aryl group, the hydroxyaryl content would be 2(17.01)/5,000=6.80×$10^{-3}$ or 6,800 parts per million by weight. In some embodiments, the polycarbonate has a hydroxyaryl content of 450 to 2,000 parts per million by weight.

The adhesion promoter can be hydroxysilyl-terminated polydiorganosiloxane. The hydroxysilyl-terminated polydiorganosiloxane can have the formula

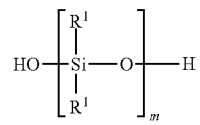

wherein m is 2 to 50, specifically 5 to 40, more specifically 10 to 40, and each occurrence of $R^1$ is independently $C_1$-$C_{12}$ hydrocarbyl, provided that 5 to 60 mole percent, specifically 10 to 50 mole percent, of the occurrences of $R^1$ are independently $C_6$-$C_{12}$ aryl. In some embodiments, the hydroxysilyl-terminated polydiorganosiloxane comprises a hydroxysilyl-terminated poly(dimethylsiloxane-co-diphenylsiloxane).

As the adhesion promoter, the composition can comprise a combination of the phenolic compound and the hydroxysilyl-terminated polydiorganosiloxane.

The composition comprises the adhesion promoter in an amount of 2 to 17 weight percent, based on the total weight of the composition. Within this range, the adhesion promoter amount can be 2 to 10 weight percent.

The composition can, optionally, further comprise atactic homopolystyrene. When present, the atactic polystyrene can be used in an amount of 0.5 to 10 weight percent, based on the total weight of the composition. Within this range, the atactic homopolystyrene amount can be 1 to 5 weight percent, specifically 1 to 3 weight percent.

The composition can, optionally, further comprise one or more additives known in the thermoplastics art. For example, the composition can, optionally, further comprise an additive selected from the group consisting of stabilizers, mold release agents, lubricants, processing aids, drip retardants, nucleating agents, UV blockers, dyes, pigments, antioxidants, anti-static agents, mineral oil, metal deactivators, and combinations thereof. When present, such additives are typically used in a total amount of less than or equal to 5 weight percent, specifically less than or equal to 3 weight percent, more specifically less than or equal to 2 weight percent, based on the total weight of the composition.

The composition can, optionally, exclude components not described herein as required or optional. For example, in some embodiments, the composition excludes one or more of polyamides, polyesters, and polyolefins.

In a very specific embodiment of the composition, the poly(phenylene ether) comprises a poly(2,6-dimethyl-1,4-phenylene ether) having an intrinsic viscosity of 0.3 to 0.5 deciliter per gram, measured at 25° C. in chloroform; the organophosphate ester comprises resorcinol bis(diphenyl phosphate); the adhesion promoter is the phenolic compound, and wherein the phenolic compound comprises a polycarbonate having a number average molecular weight of 450 to 18,000 daltons, and a hydroxyaryl content of 450 to 35,000 parts per million by weight based the weight of hydroxyl groups and the total weight of the composition; and the composition comprises 70 to 80 weight percent of the poly(phenylene ether), 4 to 8 weight percent of the polystyrene-poly(ethylene-butylene)-polystyrene triblock copolymer, 7 to 11 weight percent of the flame retardant, and 4 to 12 weight percent of the adhesion promoter.

In another very specific embodiment of the composition, the poly(phenylene ether) comprises a poly(2,6-dimethyl-1,4-phenylene ether) having an intrinsic viscosity of 0.3 to 0.5 deciliter per gram, measured at 25° C. in chloroform; the organophosphate ester comprises resorcinol bis(diphenyl phosphate); the adhesion promoter is the hydroxysilyl-terminated polydiorganosiloxane, and wherein the hydroxysilyl-terminated polydiorganosiloxane comprises a hydroxysilyl-terminated poly(dimethylsiloxane-co-diphenylsiloxane); and the composition comprises 70 to 80 weight percent of the poly(phenylene ether), 4 to 8 weight percent of the polystyrene-poly(ethylene-butylene)-polystyrene triblock copolymer, 7 to 11 weight percent of the flame retardant, and 1 to 6 weight percent of the adhesion promoter.

The composition can be prepared by melt-blending or melt-kneading the components of the composition. The melt-blending or melt-kneading can be performed using common equipment such as ribbon blenders, HENSCHEL™ mixers, BANBURY™ mixers, drum tumblers, single-screw extruders, twin-screw extruders, multi-screw extruders, co-kneaders, and the like. For example, the present composition can be prepared by melt-blending the components in a twin-screw extruder at a temperature of 280 to 320° C., specifically 290 to 310° C.

The invention includes articles molded from the composition of the invention. Suitable methods of forming such articles include single layer and multilayer sheet extrusion, injection molding, blow molding, film extrusion, profile extrusion, pultrusion, compression molding, thermoforming, pressure forming, hydroforming, vacuum forming, and the like. Combinations of the foregoing article fabrication methods can be used.

The composition is particularly useful for molding photovoltaic junction boxes and connectors. These articles are typically molded by injection molding. Specific configurations for photovoltaic junction boxes and connectors are described in, for example, U.S. Pat. No. 7,291,036 B1 to Daily et al.; U.S. Pat. No. 7,824,189 to Lauermann et al.; U.S. Patent Application Publication No. US 2010/0218797 A1 of Coyle et al.; and U.S. Patent Application Publication No. US 2010/0294903 A1 of Shmukler et al.

One embodiment is an article comprising an injection molded part and a cured potting silicone sealant in contact with a surface of the injection molded part; wherein the injection molded part comprises a composition comprising 61 to 89 weight percent of a poly(phenylene ether); 3 to 10 weight percent of a polystyrene-poly(ethylene-butylene)-polystyrene triblock copolymer having a polystyrene content of 20 to 40 weight percent and a weight average molecular weight of 200,000 to 400,000 daltons; 6 to 12 weight percent of a flame retardant comprising an organophosphate ester; and 2 to 17 weight percent of an adhesion promoter selected from the group consisting of (a) phenolic compounds having a molecular weight of 94 to 18,000 daltons; (b) hydroxysilyl-terminated polydiorganosiloxanes of the formula

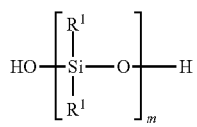

wherein m is 2 to 50, and each occurrence of $R^1$ is independently $C_1$-$C_{12}$ hydrocarbyl, provided that 5 to 60 mole percent of the occurrences of $R^1$ are independently $C_6$-$C_{12}$ aryl; and (c) combinations of the (a) phenolic compounds and the (b) hydroxysilyl-terminated polydiorganosiloxanes.

The cured potting silicone sealant can be the product of curing an uncured potting silicone sealant comprising a first polysiloxane comprising Si—H groups, a second polysiloxane comprising —CH=CH$_2$ groups, and a catalyst effective to catalyze a reaction of the Si—H groups and the —CH=CH$_2$ groups.

FIG. 1 is an elevated view of a photovoltaic junction box 10, which includes a base cover 20, two electrical cables 30, and top cover 50.

Figure 2:
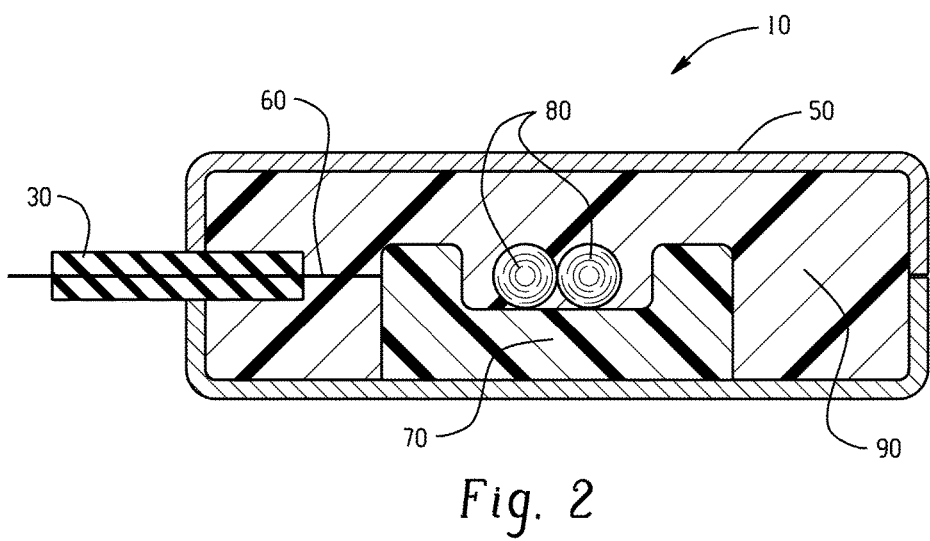
FIG. 2 is a cross-section of the photovoltaic junction box through plane AA shown in FIG. 1.

FIG. 2 is a cross-section of the photovoltaic junction box 10 through plane AA shown in FIG. 1. The cross-sectional view of the photovoltaic junction box 10 includes a base cover 20, a top cover 50, an electrical cable 30 that includes an electrical conductor 60, a diode holder 70, a diode 80, and cured potting silicone sealant 90.

All of the compositional variables described above apply as well to the composition as it is used in the injection molded part.

In a very embodiment of the article, the poly(phenylene ether) comprises a poly(2,6-dimethyl-1,4-phenylene ether) having an intrinsic viscosity of 0.3 to 0.5 deciliter per gram, measured at 25° C. in chloroform; the organophosphate ester comprises resorcinol bis(diphenyl phosphate); the adhesion promoter is the phenolic compound, and wherein the phenolic compound comprises a polycarbonate having a number average molecular weight of 450 to 18,000 daltons, and a hydroxyaryl content of 450 to 35,000 parts per million by weight based the weight of hydroxyl groups and the total weight of the composition; and the composition comprises 70 to 80 weight percent of the poly(phenylene ether), 4 to 8 weight percent of the polystyrene-poly(ethylene-butylene)-polystyrene triblock copolymer, 7 to 11 weight percent of the flame retardant, and 4 to 12 weight percent of the adhesion promoter.

In another very specific embodiment of the article, the poly(phenylene ether) comprises a poly(2,6-dimethyl-1,4-phenylene ether) having an intrinsic viscosity of 0.3 to 0.5 deciliter per gram, measured at 25° C. in chloroform; the organophosphate ester comprises resorcinol bis(diphenyl phosphate); the adhesion promoter is the hydroxysilyl-terminated polydiorganosiloxane, and wherein the hydroxysilyl-terminated polydiorganosiloxane comprises a hydroxysilyl-terminated poly(dimethylsiloxane-co-diphenylsiloxane); and the composition comprises 70 to 80 weight percent of the poly(phenylene ether), 4 to 8 weight percent of the polystyrene-poly(ethylene-butylene)-polystyrene triblock copolymer, 7 to 11 weight percent of the flame retardant, and 2 to 6 weight percent of the adhesion promoter.

The invention includes at least the following embodiments.

Embodiment 1

A composition comprising, based on the total weight of the composition: 61 to 89 weight percent of a poly(phenylene ether); 3 to 10 weight percent of a polystyrene-poly(ethylene-butylene)-polystyrene triblock copolymer having a polystyrene content of 20 to 40 weight percent and a weight average molecular weight of 200,000 to 400,000 daltons; 6 to 12 weight percent of a flame retardant comprising an organophosphate ester; and 2 to 17 weight percent of an adhesion promoter selected from the group consisting of (a) phenolic compounds having a molecular weight of 94 to 18,000 daltons; (b) hydroxysilyl-terminated polydiorganosiloxanes of the formula

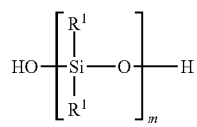

wherein m is 2 to 50, and each occurrence of $R^1$ is independently $C_1$-$C_{12}$ hydrocarbyl, provided that 5 to 60 mole percent of the occurrences of $R^1$ are independently $C_6$-$C_{12}$ aryl; and (c) combinations of the (a) phenolic compounds and the (b) hydroxysilyl-terminated polydiorganosiloxanes.

Embodiment 2

The composition of embodiment 1, wherein the poly(phenylene ether) comprises a poly(2,6-dimethyl-1,4-phenylene ether) having an intrinsic viscosity of 0.3 to 0.5 deciliter per gram, measured at 25° C. in chloroform.

Embodiment 3

The composition of embodiment 1, wherein the poly (phenylene ether) comprises a combination of a poly(phenylene ether) homopolymer and a poly(phenylene ether)-polysiloxane block copolymer, the combination having an intrinsic viscosity of 0.3 to 0.5 deciliter per gram, measured at 25° C. in chloroform.

Embodiment 4

The composition of any one of embodiments 1-3, wherein the adhesion promoter is the phenolic compound, and wherein the phenolic compound comprises a polycarbonate having a number average molecular weight of 450 to 18,000 daltons, and a hydroxyaryl content of 450 to 35,000 parts per million by weight based the weight of hydroxyl groups and the total weight of the composition.

Embodiment 5

The composition of embodiment 4, wherein the polycarbonate has a hydroxyaryl content of 450 to 2,000 parts per million by weight.

Embodiment 6

The composition of any one of embodiments 1-3, wherein the adhesion promoter is the hydroxysilyl-terminated polydiorganosiloxane.

Embodiment 7

The composition of embodiment 6, wherein the hydroxysilyl-terminated polydiorganosiloxane comprises a hydroxysilyl-terminated poly(dimethylsiloxane-co-diphenylsiloxane).

Embodiment 8

The composition of embodiment 1, wherein the poly (phenylene ether) comprises a poly(2,6-dimethyl-1,4-phenylene ether) having an intrinsic viscosity of 0.3 to 0.5 deciliter per gram, measured at 25° C. in chloroform; wherein the organophosphate ester comprises resorcinol bis(diphenyl phosphate); wherein the adhesion promoter is the phenolic compound, and wherein the phenolic compound comprises a polycarbonate having a number average molecular weight of 450 to 18,000 daltons, and a hydroxyaryl content of 450 to 35,000 parts per million by weight based the weight of hydroxyl groups and the total weight of the composition; and wherein the composition comprises 70 to 80 weight percent of the poly(phenylene ether), 4 to 8 weight percent of the polystyrene-poly(ethylene-butylene)-polystyrene triblock copolymer, 7 to 11 weight percent of the flame retardant, and 4 to 12 weight percent of the adhesion promoter.

Embodiment 9

The composition of embodiment 1, wherein the poly (phenylene ether) comprises a poly(2,6-dimethyl-1,4-phenylene ether) having an intrinsic viscosity of 0.3 to 0.5 deciliter per gram, measured at 25° C. in chloroform; wherein the organophosphate ester comprises resorcinol bis(diphenyl phosphate); wherein the adhesion promoter is the hydroxysilyl-terminated polydiorganosiloxane, and wherein the hydroxysilyl-terminated polydiorganosiloxane comprises a hydroxysilyl-terminated poly(dimethylsiloxane-co-diphenylsiloxane); and wherein the composition comprises 70 to 80 weight percent of the poly(phenylene ether), 4 to 8 weight percent of the polystyrene-poly(ethylene-butylene)-polystyrene triblock copolymer, 7 to 11 weight percent of the flame retardant, and 1 to 6 weight percent of the adhesion promoter.

Embodiment 10

An article comprising, an injection molded part, and a cured potting silicone sealant in contact with a surface of the injection molded part; wherein the injection molded part comprises a composition comprising 61 to 89 weight percent of a poly(phenylene ether); 3 to 10 weight percent of a polystyrene-poly(ethylene-butylene)-polystyrene triblock copolymer having a polystyrene content of 20 to 40 weight percent and a weight average molecular weight of 200,000 to 400,000 daltons; 6 to 12 weight percent of a flame retardant comprising an organophosphate ester; and 2 to 17 weight percent of an adhesion promoter selected from the group consisting of (a) phenolic compounds having a molecular weight of 94 to 18,000 daltons; (b) hydroxysilyl-terminated polydiorganosiloxanes of the formula

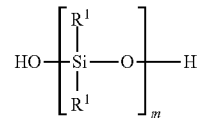

wherein m is 2 to 50, and each occurrence of $R^1$ is independently $C_1$-$C_{12}$ hydrocarbyl, provided that 5 to 60 mole percent of the occurrences of $R^1$ are independently $C_6$-$C_{12}$ aryl; and (c) combinations of the (a) phenolic compounds and the (b) hydroxysilyl-terminated polydiorganosiloxanes.

Embodiment 11

The article of embodiment 10, wherein the cured potting silicone sealant is the product of curing an uncured potting silicone sealant comprising a first polysiloxane comprising Si—H groups, a second polysiloxane comprising —CH=CH$_2$ groups, and a catalyst effective to catalyze a reaction of the Si—H groups and the —CH=CH$_2$ groups.

Embodiment 12

The article of embodiment 10 or 11, wherein the article is a photovoltaic junction box.

Embodiment 13

The article of embodiment 10, wherein the poly(phenylene ether) comprises a poly(2,6-dimethyl-1,4-phenylene ether) having an intrinsic viscosity of 0.3 to 0.5 deciliter per gram, measured at 25° C. in chloroform; wherein the organophosphate ester comprises resorcinol bis(diphenyl phosphate); wherein the adhesion promoter is the phenolic compound, and wherein the phenolic compound comprises a polycarbonate having a number average molecular weight of 450 to 18,000 daltons, and a hydroxyaryl content of 450 to 35,000 parts per million by weight based the weight of hydroxyl groups and the total weight of the composition;

and wherein the composition comprises 70 to 80 weight percent of the poly(phenylene ether), 4 to 8 weight percent of the polystyrene-poly(ethylene-butylene)-polystyrene triblock copolymer, 7 to 11 weight percent of the flame retardant, and 4 to 12 weight percent of the adhesion promoter.

Embodiment 14

The article of embodiment 10, wherein the poly(phenylene ether) comprises a poly(2,6-dimethyl-1,4-phenylene ether) having an intrinsic viscosity of 0.3 to 0.5 deciliter per gram, measured at 25° C. in chloroform; wherein the organophosphate ester comprises resorcinol bis(diphenyl phosphate); wherein the adhesion promoter is the hydroxysilyl-terminated polydiorganosiloxane, and wherein the hydroxysilyl-terminated polydiorganosiloxane comprises a hydroxysilyl-terminated poly(dimethylsiloxane-co-diphenylsiloxane); and wherein the composition comprises 70 to 80 weight percent of the poly(phenylene ether), 4 to 8 weight percent of the polystyrene-poly(ethylene-butylene)-polystyrene triblock copolymer, 7 to 11 weight percent of the flame retardant, and 2 to 6 weight percent of the adhesion promoter.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Example 1

Components used to form the compositions are summarized in Table 1.

Compositions were compounded using a Toshiba TEM-37BS co-rotating twin-screw extruder with a length to internal diameter ratio (L/D) of 40.5, an internal diameter 37 millimeters, a barrel temperature setting of at 290° C. from zones 2 to 12, a die temperature setting of 300° C., a screw rotation rate of 400 rotations per minute, and throughput of about 40 kilograms/hour. The liquid flame retardant RDP was fed to the extruder via a liquid feeder between barrels 2 and 3. Components in pellet or powder form were typically dry-blended in a plastic bag manually or using a super floater (Kawata SFC-50) prior to being introduced to the extruder at the feed throat. The resulting extruded strands were cooled by passing them through a water bath, then they were chopped into pellets. The pellets were dried for three hours at 110° C. prior to use for injection molding.

Articles for property testing were molded by single-shot injection molding. Molding conditions are summarized in Table 2.

TABLE 2

| Condition | Units | Value |
| --- | --- | --- |
| Hopper temp | ° C. | 23 |
| Zone 1 temp | ° C. | 290 |
| Zone 2 temp | ° C. | 300 |
| Zone 3 temp | ° C. | 300 |
| Zone 4 temp | ° C. | 300 |
| Mold temp | ° C. | 90 |
| Screw speed | rpm | 100 |
| Back pressure | kgf/cm$^2$ | 65 |
| Decompression | mm | 3 |
| Injection time | sec | 1.287 |
| Holding time | sec | 10 |
| Cooling time | sec | 12 |

TABLE 1

| Component | Description |
| --- | --- |
| PPE | Poly(2,6-dimethyl-1,4-phenylene ether), CAS Reg. No. 24938-67-8, having an intrinsic viscosity of about 0.40 deciliter per gram as measured in chloroform at 25° C.; obtained as PPO 640 from SABIC Innovative Plastics. |
| RDP | Resorcinol bis(diphenyl phosphate), CAS Reg. No. 57583-54-7; obtained as RDP from Jiangsu Yoke Technology Co., Ltd. |
| SEBS | Polystyrene-poly(ethylene-butylene)-polystyrene triblock copolymer, CAS Reg. No. 66070-58-4, having a polystyrene content of about 30 to 33 weight percent and a weight average molecular weight of about 240,000 to 301,000 atomic mass units; obtained as KRATON ™ G1651 from Kraton Performance Polymers Inc. |
| PS | Atactic polystyrene, CAS Reg. No. 9003-53-6, having a melt flow index of about 2.0-2.8 grams per 10 minutes measured at 200° C. and 5 kilogram load; obtained as 686E from Styron. |
| PDMDPS | Hydroxysilyl-terminated poly(dimethylsiloxane-co-diphenylsiloxane), CAS Reg. No. 68083-14-7; having a viscosity of about 40-80 millipascal-seconds determined by Brookfield Viscometer at 25° C.; obtained as SF1023 from Momentive Performance Materials. |
| Melt PC | Phenoxy-terminated bisphenol A polycarbonate, CAS Reg. No. 25929-04-8, synthesized by melt polymerization and having a number average molecular weight of about 18,000 daltons and a hydroxyl group content of 1728 parts per million by weight; obtained as LEXAN ™ 5832C Resin from Sabic Innovative Plastics. |
| Interfacial PC | p-Cumylphenol-terminated bisphenol A polycarbonate, CAS Reg. No. 111211-39-3, synthesized by interfacial polymerization and having a number average molecular weight of about 18,000 daltons and a hydroxyl group content of 149 parts per million by weight; preparable according to the method of U.S. Pat. No. 5,300,623 of Boden et al. |
| Phosphite | Tris(2,4-di-tert-butylphenyl) phosphite, CAS Reg. No. 31570-04-4; obtained as IRGAFOS ™ 168 from BASF. |
| ZnO | Zinc oxide, CAS Reg. No. 1314-13-2; obtained as ZINKOXYD aktiv ™ from Bayer. |
| ZnS | Zinc sulfide, CAS Reg. No. 1314-98-3; obtained as SACHTOLITH ™ HD-S from Sachtleben Chemie GmbH. |
| CB | Carbon black, CAS Reg. No. 1333-86-4; obtained as CXS439 from Cabot. |

TABLE 2-continued

| Condition | Units | Value |
|---|---|---|
| Molding Machine | NONE | ES3000 |
| Mold Type (insert) | NONE | ASTM-Family |
| Shot volume | mm | 40 |
| Switch point (mm) | mm | 10 |
| Injection speed (mm/s) | mm/sec | 50 |
| Holding pressure | kgf/cm² | 700 |
| Max. Injection pressure | kgf/cm² | 800 |
| Transfer pressure | kgf/cm² | 0 |
| Cycle time | sec | 32 |
| Cushion | mm | 8.19 |

Cohesive failure was measured according to GB/T 16997-1997 to judge the failure mode. The potting sealant used was a two-component type sealant obtained as TONSAN™ 1521 from Tonsan Adhesive Co., Ltd. Before pouring the sealant on the part, the two components were mixed together in the required ratio. The curable composition so formed was poured onto the molded part, and cured for 7 days at 23° C. To determine the failure mode, the cured sealant was torn from the molded part surface. A failure mode of "cohesive failure" means that the cured sealant tears within itself and remains fully bonded to the substrate. A failure mode of "adhesive failure" means that the cured sealant releases from the substrate. 100% cohesive failure is desirable, because it indicates that the strength of adhesion to the molded part is greater than the strength of cohesion of the cured sealant to itself.

Curing time was measured according to sealant producer's method. After the potting sealant was poured into the part, the curing was started. Generally a photovoltaic junction box manufacturer will check the adhesion performance after curing for 7 days at ambient temperature. If parts exhibit 0% cohesive failure after curing 7 days, it will be difficult to achieve good adhesion between the sealant and the molded part, because the sealant will have cured completely. For the Results in Table 3, sealant was placed on molded parts in the form of flat chips, and the adhesion status was checked each day. The curing time was the shorter of seven days or the number of days needed to achieve 100% cohesive failure.

Compositions and properties are summarized in Table 3, where component amounts are expressed in weight percent based on the total weight of the composition.

Example 1 illustrates the effect of adding hydroxysilyl-terminated poly(dimethylsiloxane-co-diphenylsiloxane) to the Comparative Example 1 composition, the addition being compensated by proportional decreases in the contents of all other components. The hydroxysilyl-terminated poly(dimethylsiloxane-co-diphenylsiloxane), added at slightly less than 3 weight percent, greatly improved cohesion between the molded part and the potting silicone sealant.

Example 2 illustrates the effects of adding a low molecular weight melt polycarbonate to the Comparative Example 1 composition, the addition being compensated by proportional decreases in the contents of all other components. The low molecular weight melt polycarbonate, added at slightly less than 5 weight percent, substantially improved cohesion between the molded part and the potting silicone sealant.

Example 3 includes a higher concentration of the low molecular weight melt polycarbonate (9 weight percent), which is compensated by proportional decreases in the contents of all other components. At the higher concentration, the low molecular weight melt polycarbonate greatly improves cohesion between the molded part and the potting silicone sealant.

Example 4 illustrates the effect of adding a low molecular weight interfacial polycarbonate to the Comparative Example 1 composition, the addition being compensated by proportional decreases in the contents of all other components. The low molecular weight interfacial polycarbonate, added at slightly less than 5 weight percent, exhibits slightly improved cohesion between the molded part and the potting silicone sealant.

Example 5 includes a higher concentration of the low molecular weight interfacial polycarbonate (9 weight percent), which is compensated by proportional decreases in the contents of all other components. At the higher concentration, the low molecular weight interfacial polycarbonate exhibits improved cohesion between the molded part and the potting silicone sealant.

TABLE 3

| | C. Ex. 1 | Ex. 1 | Ex. 2 | Ex. 3 | Ex. 4 | Ex. 5 |
|---|---|---|---|---|---|---|
| COMPOSITIONS | | | | | | |
| PPE | 80.33 | 78.02 | 76.55 | 73.10 | 76.55 | 73.10 |
| RDP | 9.70 | 9.42 | 9.24 | 8.82 | 9.24 | 8.82 |
| SEBS | 6.13 | 5.96 | 5.84 | 5.58 | 5.84 | 5.58 |
| PS | 1.98 | 1.92 | 1.89 | 1.80 | 1.89 | 1.80 |
| PDMDPS | 0.00 | 2.88 | 0.00 | 0.00 | 0.00 | 0.00 |
| Melt PC | 0.00 | 0.00 | 4.71 | 9.00 | 0.00 | 0.00 |
| Interfacial PC | 0.00 | 0.00 | 0.00 | 0.00 | 4.71 | 9.00 |
| Phosphite | 0.10 | 0.10 | 0.09 | 0.09 | 0.09 | 0.09 |
| ZnO | 0.15 | 0.14 | 0.14 | 0.14 | 0.14 | 0.14 |
| ZnS | 0.15 | 0.14 | 0.14 | 0.14 | 0.14 | 0.14 |
| CB | 1.46 | 1.42 | 1.40 | 1.33 | 1.40 | 1.33 |
| PROPERTIES | | | | | | |
| Cohesion failure (%) | 0 | 100 | 50 | 100 | 5 | 40 |
| Curing time (days) | 7 | 6 | 6 | 6 | 6 | 6 |

The invention claimed is:

1. A composition comprising, based on the total weight of the composition:
   61 to 89 weight percent of a poly(phenylene ether);
   3 to 10 weight percent of a polystyrene-poly(ethylene-butylene)-polystyrene triblock copolymer having a polystyrene content of 20 to 40 weight percent and a weight average molecular weight of 200,000 to 400,000 daltons;
   6 to 12 weight percent of a flame retardant comprising an organophosphate ester; and
   2 to 17 weight percent of an adhesion promoter selected from the group consisting of
   (a) phenolic compounds having a molecular weight of 94 to 18,000 daltons;
   (b) hydroxysilyl-terminated polydiorganosiloxanes of the formula

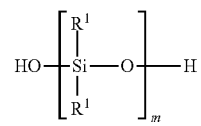

wherein m is 2 to 50, and each occurrence of $R^1$ is independently $C_1$-$C_{12}$ hydrocarbyl, provided that 5 to 60 mole percent of the occurrences of $R^1$ are independently $C_6$-$C_{12}$ aryl; and
   (c) combinations of the (a) phenolic compounds and the (b) hydroxysilyl-terminated polydiorganosiloxanes.

2. The composition of claim 1, wherein the poly(phenylene ether) comprises a poly(2,6-dimethyl-1,4-phenylene ether) having an intrinsic viscosity of 0.3 to 0.5 deciliter per gram, measured at 25° C. in chloroform.

3. The composition of claim 1, wherein the poly(phenylene ether) comprises a combination of a poly(phenylene ether) homopolymer and a poly(phenylene ether)-polysiloxane block copolymer, the combination having an intrinsic viscosity of 0.3 to 0.5 deciliter per gram, measured at 25° C. in chloroform.

4. The composition of claim 1,
wherein the poly(phenylene ether) comprises a poly(2,6-dimethyl-1,4-phenylene ether) having an intrinsic viscosity of 0.3 to 0.5 deciliter per gram, measured at 25° C. in chloroform;
wherein the organophosphate ester comprises resorcinol bis(diphenyl phosphate);
wherein the adhesion promoter is the phenolic compound, and wherein the phenolic compound comprises a polycarbonate having a number average molecular weight of 450 to 18,000 daltons, and a hydroxyaryl content of 450 to 35,000 parts per million by weight based the weight of hydroxyl groups and the total weight of the composition; and
wherein the composition comprises
70 to 80 weight percent of the poly(phenylene ether),
4 to 8 weight percent of the polystyrene-poly(ethylene-butylene)-polystyrene triblock copolymer,
7 to 11 weight percent of the flame retardant, and
4 to 12 weight percent of the adhesion promoter.

5. The composition of claim 1,
wherein the poly(phenylene ether) comprises a poly(2,6-dimethyl-1,4-phenylene ether) having an intrinsic viscosity of 0.3 to 0.5 deciliter per gram, measured at 25° C. in chloroform;
wherein the organophosphate ester comprises resorcinol bis(diphenyl phosphate);
wherein the adhesion promoter is the hydroxysilyl-terminated polydiorganosiloxane, and
wherein the hydroxysilyl-terminated polydiorganosiloxane comprises a hydroxysilyl-terminated poly(dimethylsiloxane-co-diphenylsiloxane); and
wherein the composition comprises
70 to 80 weight percent of the poly(phenylene ether),
4 to 8 weight percent of the polystyrene-poly(ethylene-butylene)-polystyrene triblock copolymer,
7 to 11 weight percent of the flame retardant, and
1 to 6 weight percent of the adhesion promoter.

6. The composition of claim 1, wherein the adhesion promoter is the phenolic compound, and wherein the phenolic compound comprises a polycarbonate having a number average molecular weight of 450 to 18,000 daltons, and a hydroxyaryl content of 450 to 35,000 parts per million by weight based the weight of hydroxyl groups and the total weight of the composition.

7. The composition of claim 6, wherein the polycarbonate has a hydroxyaryl content of 450 to 2,000 parts per million by weight.

8. The composition of claim 1, wherein the adhesion promoter is the hydroxysilyl-terminated polydiorganosiloxane.

9. The composition of claim 8, wherein the hydroxysilyl-terminated polydiorganosiloxane comprises a hydroxysilyl-terminated poly(dimethylsiloxane-co-diphenylsiloxane).

10. An article comprising,
an injection molded part, and
a cured potting silicone sealant in contact with a surface of the injection molded part;
wherein the injection molded part comprises a composition comprising
61 to 89 weight percent of a poly(phenylene ether);
3 to 10 weight percent of a polystyrene-poly(ethylene-butylene)-polystyrene triblock copolymer having a polystyrene content of 20 to 40 weight percent and a weight average molecular weight of 200,000 to 400,000 daltons;
6 to 12 weight percent of a flame retardant comprising an organophosphate ester; and
2 to 17 weight percent of an adhesion promoter selected from the group consisting of
(a) phenolic compounds having a molecular weight of 94 to 18,000 daltons;
(b) hydroxysilyl-terminated polydiorganosiloxanes of the formula

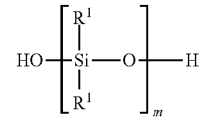

wherein m is 2 to 50, and each occurrence of $R^1$ is independently $C_1$-$C_{12}$ hydrocarbyl, provided that 5 to 60 mole percent of the occurrences of $R^1$ are independently $C_6$-$C_{12}$ aryl; and
(c) combinations of the (a) phenolic compounds and the (b) hydroxysilyl-terminated polydiorganosiloxanes.

11. The article of claim 10, wherein the cured potting silicone sealant is the product of curing an uncured potting silicone sealant comprising a first polysiloxane comprising Si—H groups, a second polysiloxane comprising CH═$CH_2$ groups, and a catalyst effective to catalyze a reaction of the Si—H groups and the CH═$CH_2$ groups.

12. The article of claim 10, wherein the article is a photovoltaic junction box.

13. The article of claim 10,
wherein the poly(phenylene ether) comprises a poly(2,6-dimethyl-1,4-phenylene ether) having an intrinsic viscosity of 0.3 to 0.5 deciliter per gram, measured at 25° C. in chloroform;
wherein the organophosphate ester comprises resorcinol bis(diphenyl phosphate);
wherein the adhesion promoter is the phenolic compound, and wherein the phenolic compound comprises a polycarbonate having a number average molecular weight of 450 to 18,000 daltons, and a hydroxyaryl content of 450 to 35,000 parts per million by weight based the weight of hydroxyl groups and the total weight of the composition; and
wherein the composition comprises
70 to 80 weight percent of the poly(phenylene ether),
4 to 8 weight percent of the polystyrene-poly(ethylene-butylene)-polystyrene triblock copolymer,
7 to 11 weight percent of the flame retardant, and
4 to 12 weight percent of the adhesion promoter.

14. The article of claim 10,
wherein the poly(phenylene ether) comprises a poly(2,6-dimethyl-1,4-phenylene ether) having an intrinsic viscosity of 0.3 to 0.5 deciliter per gram, measured at 25° C. in chloroform;

wherein the organophosphate ester comprises resorcinol bis(diphenyl phosphate);

wherein the adhesion promoter is the hydroxysilyl-terminated polydiorganosiloxane, and wherein the hydroxysilyl-terminated polydiorganosiloxane comprises a hydroxysilyl-terminated poly(dimethylsiloxane-co-diphenylsiloxane); and wherein the composition comprises
- 70 to 80 weight percent of the poly(phenylene ether),
- 4 to 8 weight percent of the polystyrene-poly(ethylene-butylene)-polystyrene triblock copolymer,
- 7 to 11 weight percent of the flame retardant, and
- 2 to 6 weight percent of the adhesion promoter.

* * * * *